(12) United States Patent
Averill et al.

(10) Patent No.: US 8,761,362 B2
(45) Date of Patent: Jun. 24, 2014

(54) CALL CENTER CALL PARKER

(75) Inventors: Roderick B. Averill, Centennial, CO (US); Renato Simoes, Fortaleza-CE (BR)

(73) Assignee: Avaya Inc., Basking Ridge, NJ (US)

( * ) Notice: Subject to any disclaimer, the term of this patent is extended or adjusted under 35 U.S.C. 154(b) by 249 days.

(21) Appl. No.: 12/964,863

(22) Filed: Dec. 10, 2010

(65) Prior Publication Data

US 2012/0148038 A1 Jun. 14, 2012

(51) Int. Cl.
*H04M 15/00* (2006.01)
(52) U.S. Cl.
USPC .. 379/134; 379/133; 379/266.01; 379/265.02
(58) Field of Classification Search
USPC .......... 379/111–141, 265.02, 265.11, 265.05, 379/265.06, 266.01
See application file for complete search history.

(56) References Cited

U.S. PATENT DOCUMENTS

| | | | |
|---|---|---|---|
| 5,185,786 A | 2/1993 | Zwick | |
| 6,044,144 A * | 3/2000 | Becker et al. | 379/265.02 |
| 6,999,579 B2 | 2/2006 | Flockhart et al. | |
| 7,818,010 B2 | 10/2010 | Matteo et al. | |
| 2004/0148395 A1 * | 7/2004 | Schulzrinne | 709/227 |
| 2006/0067506 A1 * | 3/2006 | Flockhart et al. | 379/265.09 |
| 2007/0070980 A1 * | 3/2007 | Phelps et al. | 370/352 |
| 2010/0103927 A1 * | 4/2010 | Bakker | 370/352 |

* cited by examiner

*Primary Examiner* — Duc Nguyen
*Assistant Examiner* — Yosef K Laekemariam
(74) *Attorney, Agent, or Firm* — Sheridan Ross P.C.

(57) ABSTRACT

A call parker monitors calls between callers and a call center to determine the number of active calls to the call center. A maximum call center capacity is identified and compared to the number of active calls to determine if the maximum call center capacity is being met. If the maximum call center capacity has been met, new calls are intercepted and placed on hold until the maximum call center capacity is no longer being met (i.e., an agent completes a call). Once the maximum call center capacity is no longer being met, the new call(s) are transferred to the call center.

16 Claims, 5 Drawing Sheets

CALL CENTER CALL PARKER

TECHNICAL FIELD

The system and method relates to call centers, and more specifically to systems and methods for handling high call volumes in call centers.

BACKGROUND

Typically, when a caller calls into a call center, the caller will be directed through an Interactive Voice Response (IVR) system and then be placed in a waiting queue until the caller is serviced by an agent. This works well when the call volume does not exceed the maximum capacity of the call center. However, call centers can experience peak call volume periods where the capacity of the call center is exceeded. When a caller calls in during these peak periods, the caller will be unable to connect to the call center and will only get a busy signal. This can result in lost calls and reduced customer satisfaction.

One option is to upgrade the call center so that the call center can handle these peak periods. Upgrading the call center with new hardware/software and additional agents can solve this problem. Upgrades to the call center to handle additional calls are typically very expensive due to the expense of upgrading the capability of IVR systems and other hardware/software for processing the higher volume of calls. Moreover, in many cases, it requires the call center to completely replace existing systems, which can be cost-prohibitive. In many cases, the excessive cost cannot be justified in situations where these peak periods occur infrequently. What is needed is a cost-effective solution that will handle these higher peak call periods while preserving the existing call center hardware/software.

SUMMARY

The system and method are directed to solving these and other problems and disadvantages of the prior art. A call parker monitors calls between callers and a call center to determine the number of active calls to the call center. A maximum call center capacity is identified and compared to the number of active calls to determine if the maximum call center capacity is being met. If the maximum call center capacity has been met, new calls are intercepted and placed on hold until the maximum call center capacity is no longer being met (i.e., an agent completes a call). Once the maximum call center capacity is no longer being met, the new call(s) are transferred to the call center.

The process of determining that the call center is at maximum capacity can be determined in a variety of ways, such as looking for SIP BUSY messages from the call center, by monitoring the number of active calls, by user-administered parameters, by querying the call center, and the like. The monitored calls can be audio and/or video calls.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Some embodiments will be illustrated below in conjunction with an exemplary communication system. Although well suited for use with, e.g., a system using switch(es), server(s) and/or database(s), communications endpoints, etc., the embodiments are not limited to use with any particular type of communication system or configuration of system elements. Those skilled in the art will recognize that the disclosed techniques may be used in any communication application in which it is desirable to provide enhanced monitoring of a call center. These variations shall be discussed herein as the various embodiments are set forth.

Figure 1:
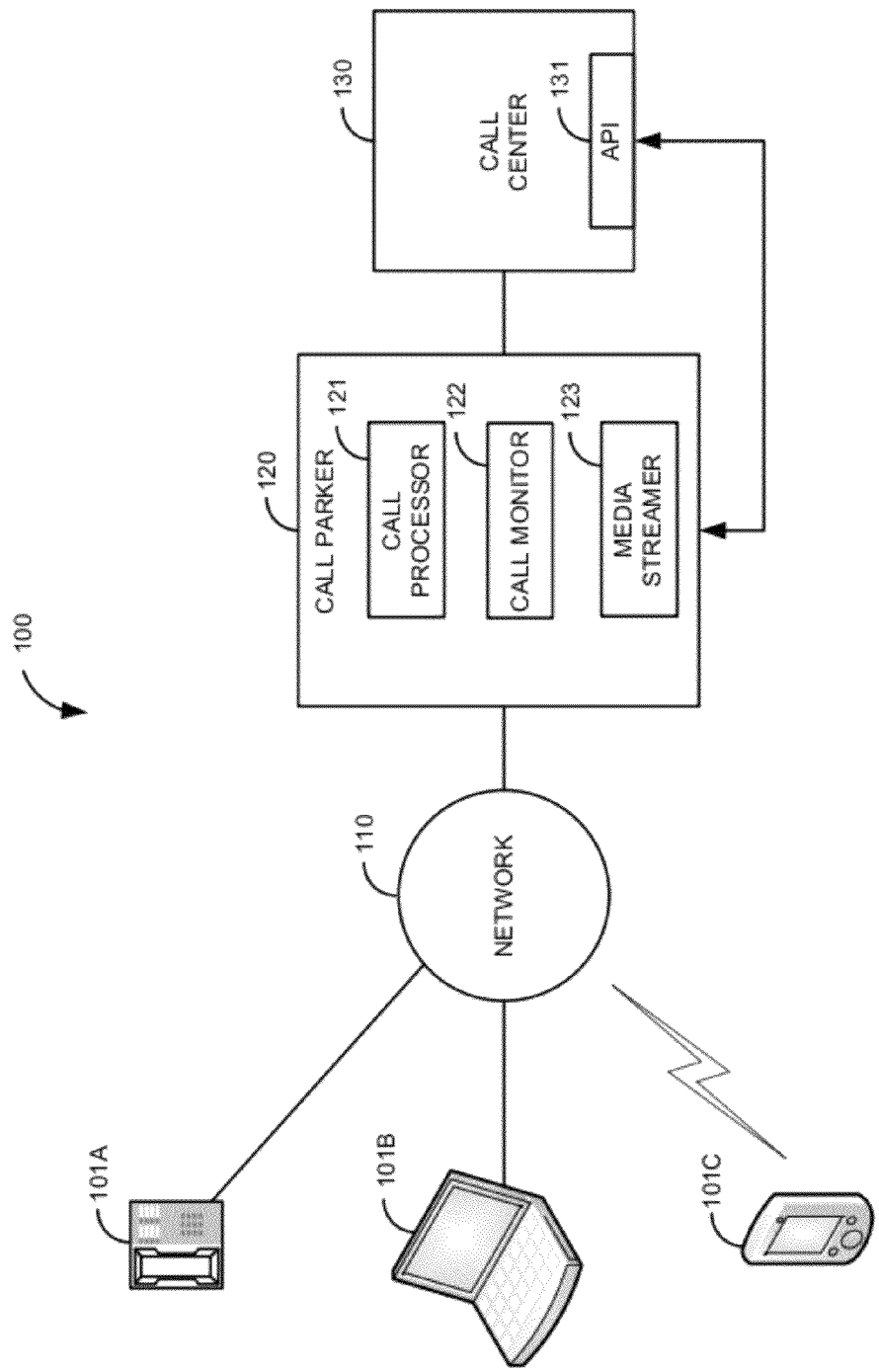
FIG. 1 is a block diagram of a first illustrative system for monitoring calls into a call center.

FIG. 1 is a block diagram of a first illustrative system 100 for monitoring calls into a call center 130. The first illustrative system 100 comprises communication devices 101A-C, network 110, call parker 120, and call center 130. The first illustrative system 100 is shown with communication devices 101A-C to illustrate that a variety of different types and number of communication devices 101 can place calls to or receive calls from call center 130. Communication devices 101A-C can be any type of communication device, such as a telephone, a Personal Computer (PC), a Personal Digital Assistant (PDA), a video communication device, a cellular telephone, and the like. Network 110 can be any type or combination of networks, such as the Internet, the Public Switched Telephone Network (PSTN), a Local Area Network (LAN), a Wide Area Network, a corporate network, and the like.

Call parker 120 can be any device or combination of devices that can monitor audio and/or video calls, such as a server, a router, a network analyzer, a switch, and the like. Call parker 120 further comprises call processor 121, call monitor 122, and media streamer 123. Call processor 121 can be any hardware/software that can process audio and/or video calls. Call processor 121 can process a variety of protocols, such as Session Initiation Protocol (SIP), H.323, video protocols, Plain Old Telephone Service (POTS), Integrated Digital Services Network (ISDN), Internet Protocol (IP), and the like. Call monitor 122 can be any hardware/software that can monitor audio and/or video calls, such as a protocol analyzer, a packet monitor, and the like. Media streamer 123 can be any device that can stream a media signal, such as an Interactive Voice Response (IVR) system, an audio server, a video server, and the like.

Call center 130 can be any call center that can process calls to or from callers, such as a contact center. Call center 130 can support various types of calls, such as audio calls, video calls, emails, Instant Messages, and the like. Call center 130 typically has agents that handle the calls as they come in to call center 130. Calls can be processed by call center 130 in various ways, such as with IVRs, placing calls into call queues, routing calls based on caller information, and the like.

Incoming calls to call center 130 are typically processed by agents when the agents become available to process calls that have been placed in waiting queues. Call center 130 can also comprise Application Programming Interface (API) 131. Application Programming Interface 131 is an interface that can be called programmatically to get information from call center 130.

Call monitor 122 identifies a maximum call center capacity. The maximum call center capacity is the number of active calls that call center 130 can support without responding that call center 130 is busy or has reached call capacity and cannot handle any more incoming calls. An active call can be any type of call that has not been dropped or terminated, such as a call that is being handled by an agent, a call that is placed in a queue, a call that is on hold, and the like. The maximum call center capacity can be based on a number of audio calls, a number of video calls, or a combination of both. The maximum call center capacity can be based on the number of calls into call center 130, the number of calls placed from call center 130, or a combination of both.

The maximum call center capacity can be identified in various ways. For example, call monitor 122 can identify the maximum call center capacity by getting the maximum call center capacity from an administrated parameter; the administered parameter tells call monitor 122 how many calls call center 130 can support. Call monitor 122 can then monitor the number of active calls into call center 130 to determine when the maximum call center capacity has been met by determining how many calls are active and comparing that number to the maximum call center capacity. If the number of active calls is equal to the maximum call center capacity, then the maximum call center capacity has been met. Call monitor 122 is constantly monitoring the active calls to call center 130 to determine if the maximum call center capacity is still being met.

In response to determining that the maximum call center capacity has been met, call processor 121 intercepts a new call request to call center 130. A new call request can be, for example, a SIP INVITE. One skilled in the art will recognize that the type and format of a new call request will vary depending on the protocol(s) that are used to make the call. Intercepting a call request can be done various ways. For example, call processor 121 can respond to a SIP INVITE instead of passing the SIP invite to call center 130. Call processor 121 places the new call on hold. While the call is placed on hold, media streamer 123 can optionally stream a message to the caller indicating that call center 130 is experiencing heavy call volumes.

Call monitor 122 determines that the maximum call center capacity is no longer being met. For example, call monitor 122 can determine that the maximum call center capacity is no longer being met by detecting that an agent or a caller has dropped a call to call center 130. In response to the maximum call center capacity no longer being met, call processor 121 transfers the new call to call center 130. Call center 130 can now process the new call using traditional methods.

Figure 2:
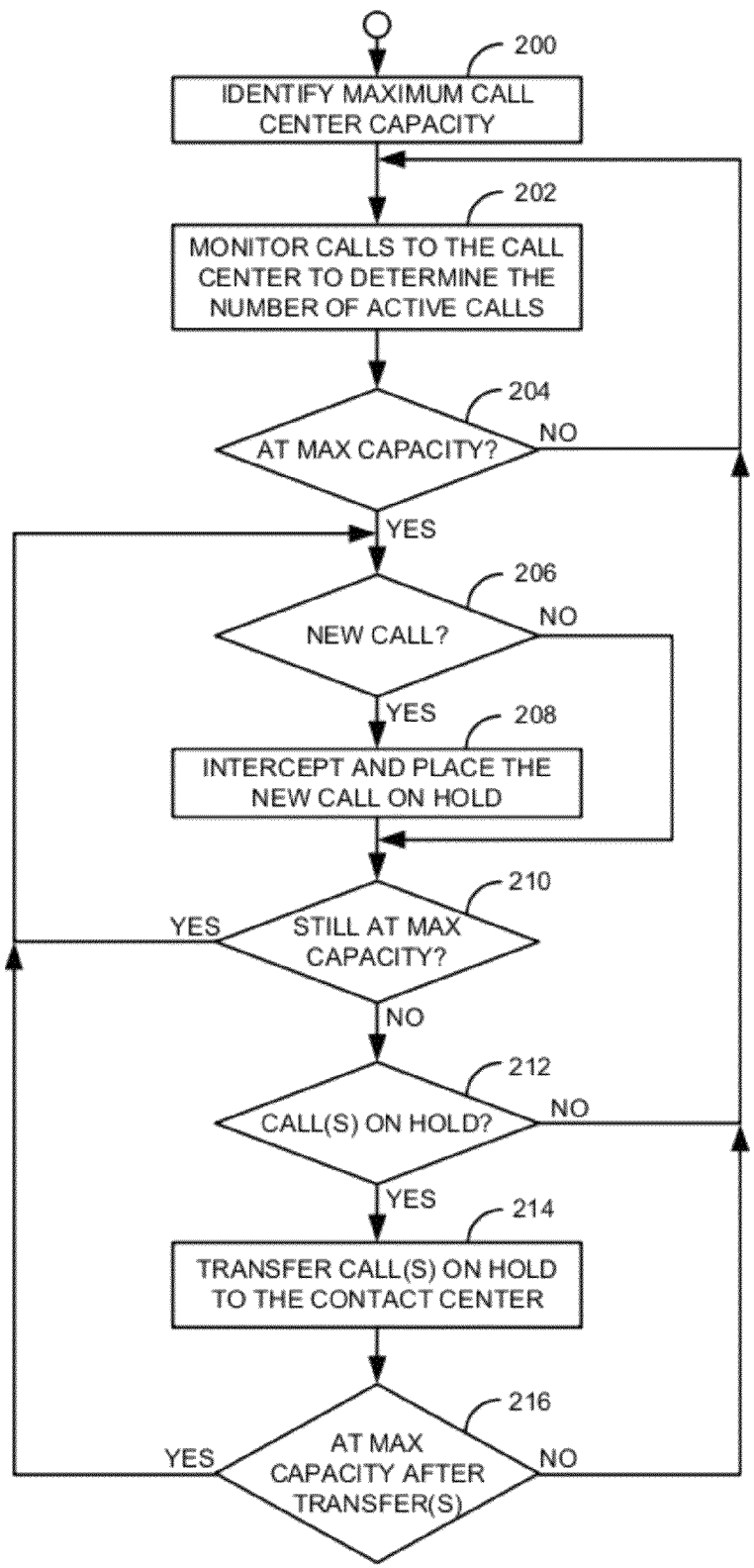
FIG. 2 is a flow diagram of a method for monitoring calls into a call center.

FIG. 2 is a flow diagram of a method for monitoring calls into call center 130. Illustratively, communication device 101, call parker 120, and call center 130 are stored-program-controlled entities, such as a computer or processor, which perform the method of FIGS. 2-5 and the processes described herein by executing program instructions stored in a tangible computer readable storage medium, such as a memory or disk.

Call monitor 122 identifies 200 the maximum call center capacity. Call monitor 122 monitors 202 calls to call center 130 to determine a number of active calls to call center 130. If it is determined that the number of calls into call center 130 is not at (equal to) the maximum call center capacity in step 204, the process goes to step 202. Otherwise, if it is determined that the number of active calls into call center 130 is at the maximum call center capacity in step 204, the process goes to step 206. Call processor 121 looks for a new call into call center 130 in step 206. If there is not a new call to call center 130 in step 206, the process goes to step 210. Otherwise, if there is a new call to call center 130 in step 206, call processor 121 intercepts 208 the new call and places the new call on hold. The process then goes to step 210.

Call monitor 122 determines if the maximum call center capacity is no longer being met in step 210. Call monitor 122 can determine this by monitoring the call signaling messages to determine that a call into call center 130 has been completed (e.g., by seeing a SIP BYE message from call center 130); based on this, call monitor 122 will know that the maximum call center capacity is no longer being met because the number of active calls will now be one call below the maximum call center capacity. If the call center capacity is still at maximum in step 210, the process goes to step 206 to look for a new call. Otherwise, if the call center capacity is no longer at maximum in step 210, call processor 121 determines in step 212 if any calls are on hold. If no calls are on hold in step 212, the process goes to step 202. Otherwise, if there is a call(s) on hold in step 212, call processor 121 transfers 214 the call(s) on hold to call center 130 and the process goes to step 216. The actual number of calls that are transferred to call center 130 depends on whether the transferred call(s) brings the total number of calls up to the maximum call center capacity.

For example, assume that the maximum call center capacity is one hundred calls and that two new calls had been placed on hold while waiting for call center 130 to complete a call (drop below the maximum call center capacity); at this point, call processor 121 will only transfer a single call to call center 130 because transferring the single call brings the number of active calls back up to the maximum call center capacity (100 calls). If call processor 121 tried to transfer the second new call, call center 130 would not be able to process the additional call because it would be above the maximum call center capacity.

In step 216, call monitor 122 determines if the number of active calls (including the transferred calls) is at the maximum call center capacity. If the number of active calls is at the maximum call center capacity in step 216, the process goes to step 206 to look for any new calls. Otherwise, if the number of active calls is not at the maximum call center capacity in step 212, the process goes to step 202.

Figure 3:
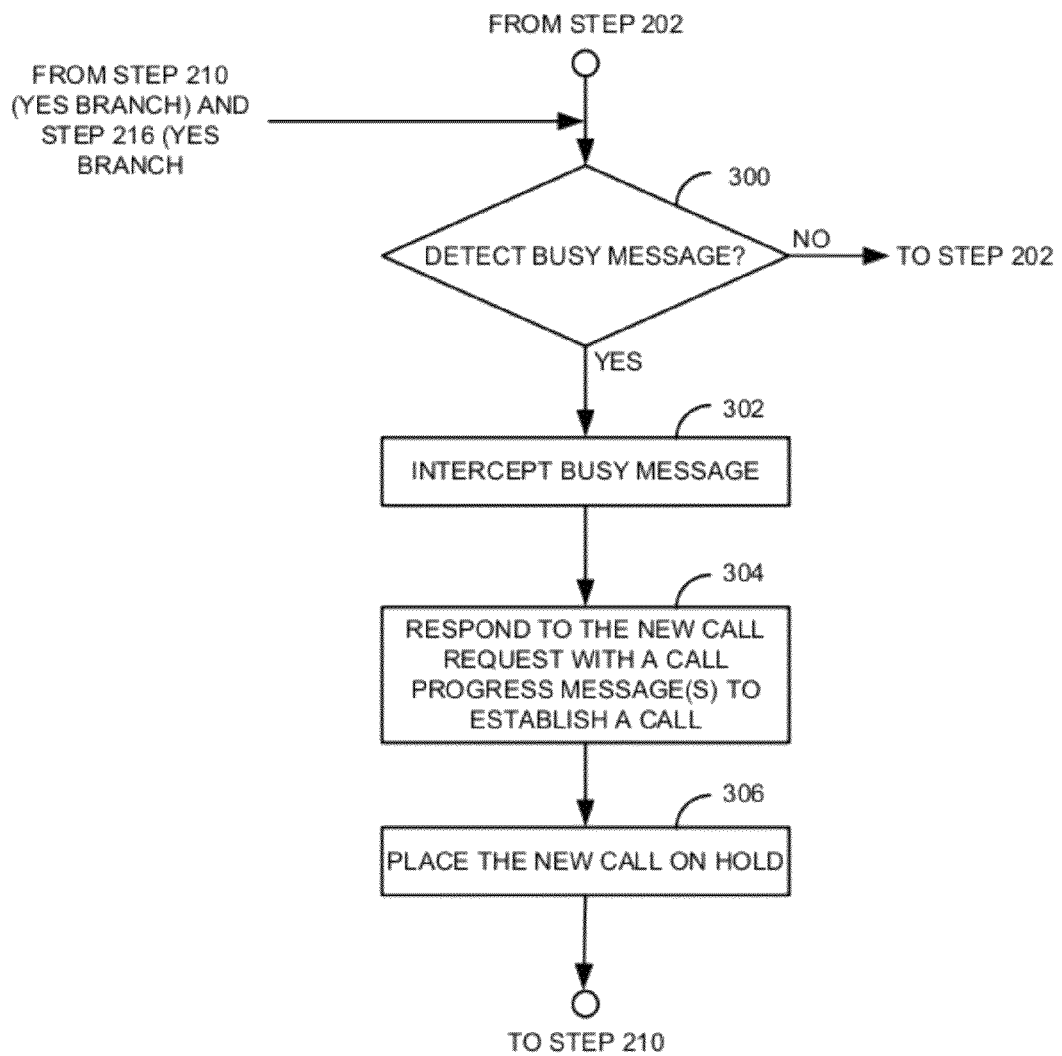
FIG. 3 is a flow diagram of a method for placing calls on hold based on detecting a busy message.

FIG. 3 is a flow diagram of a method for placing calls on hold based on detecting a busy message. FIG. 3 is an alternative way of detecting if call center 130 is at maximum capacity. FIG. 3 replaces steps 204, 206, and 208 of FIG. 2. After monitoring calls to determine the number of active calls in step 202, call processor 121 looks for a busy message. Depending on the protocol, the busy message can be any message that signals that call center 130 is busy. If call processor 121 does not detect a busy message in step 300, the process goes to step 202. Otherwise, if call processor 121 detects a busy message in step 300, call processor 121 intercepts 302 the busy message from call center 130. If the busy message were passed back to the caller (i.e., the caller's communication device 101) instead of being intercepted in step 302, the call would end. In place of passing the busy message to the caller's communication device 101, call processor 121 responds 304 to the new call (i.e., the call that call center 130 responded with a busy message) with a call progress message(s). The call progress message(s) would be the necessary messages for the protocol used to establish the call from call parker 120 to the caller's communication device 101. Once the call is established, call processor 121 places 306 the new call on hold and the process goes to step 210.

Figure 4:
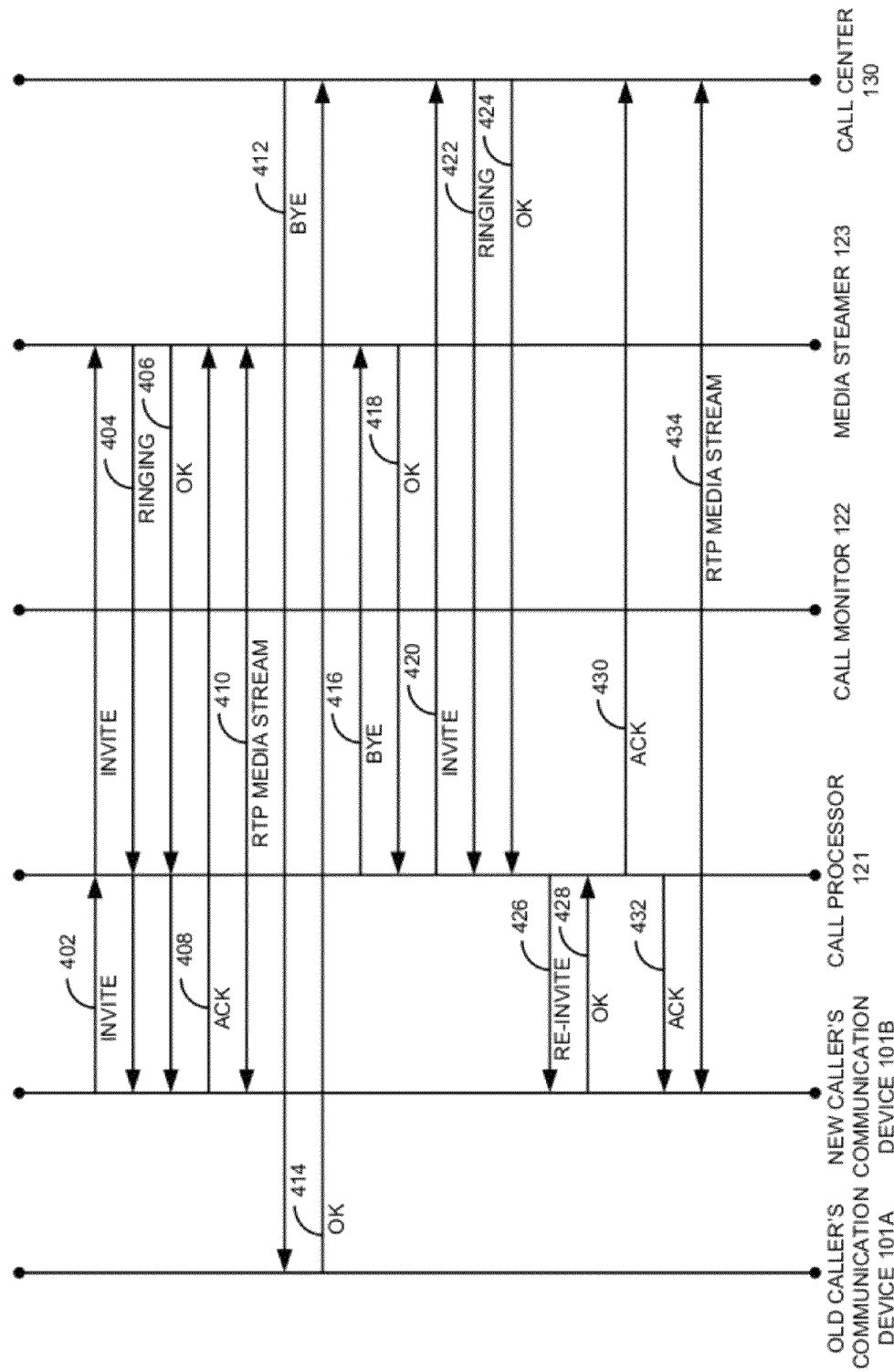
FIG. 4 is a flow diagram of a method of monitoring Session Initiation Protocol (SIP) calls into a call center.

FIG. 4 is a flow diagram of a method of monitoring Session Initiation Protocol (SIP) calls into call center 130. FIG. 4 describes the SIP call flow at the point where call center 130 is at maximum call center capacity and a new caller tries to call call center 130. Call monitor 122 monitors calls (SIP packets) between callers and call center 130 to determine the maximum call center capacity. After reaching the maximum call center capacity, a new call is initiated to call center 130 in step 402. In this example, a SIP INVITE (call request) is sent from new caller's communication device 101B to call center 130. Call processor 121 intercepts the incoming SIP INVITE. Instead of sending the SIP INVITE to call center 130, the SIP INVITE is sent to media streamer 123. Media streamer 123 answers in step 404 the SIP INVITE by responding with a SIP RINGING message and a SIP OK in step 406. New caller's communication device 101B responds to the SIP OK by sending a SIP ACK to media streamer 123 in step 408. The result is that the call is placed on hold by media streamer 123 instead of going to call center 130. Media streamer 123 can now stream in step 410 (via a Real-time Transport Protocol (RTP) media stream) various messages to the new caller, such as call center 130 is experiencing heavy call volumes to new caller's communication device 101B.

An old caller's call is dropped. For example, an agent in call center 130 has hung up, resulting in the SIP BYE being sent in step 412 to the old caller's communication device 101A. The old caller's communication device 101A responds to the SIP BYE by sending a SIP OK in step 414 to call center 130. By monitoring the messages sent in steps 412 and 414, call monitor 122 can determine that the maximum call center capacity is no longer being met because there is one less call being handled by call center 130. Based on the maximum call center capacity no longer being met, call processor 121 sends a SIP BYE in step 416 to media streamer 123. Media streamer 123 responds to the SIP BYE in step 418 with a SIP OK. Call processor 121 sends a SIP INVITE in step 420 to call center 130. Call center 130 responds to the SIP INVITE with a SIP RINGING message in step 422. When the call is answered by call center 130, a SIP OK is sent in step 424.

Call processor 121 also sends a SIP RE-INVITE to the new caller's communication device 101B in step 426. The new caller's communication device 101B responds to the SIP RE-INVITE with a SIP OK in step 428. Call processor 121 sends a SIP ACK in step 430 to call center 130 and a SIP ACK to the new caller's communication device 101B in step 432. This effectively transfers the new call from call parker 120 to call center 130. An RTP media stream can now be sent between the new caller's communication device 101B and call center 130 in step 434. The information sent in step 434 can be, for example, the video of a user interacting with a video Interactive Voice Response (IVR) system or the user talking to an agent in call center 130.

Figure 5:
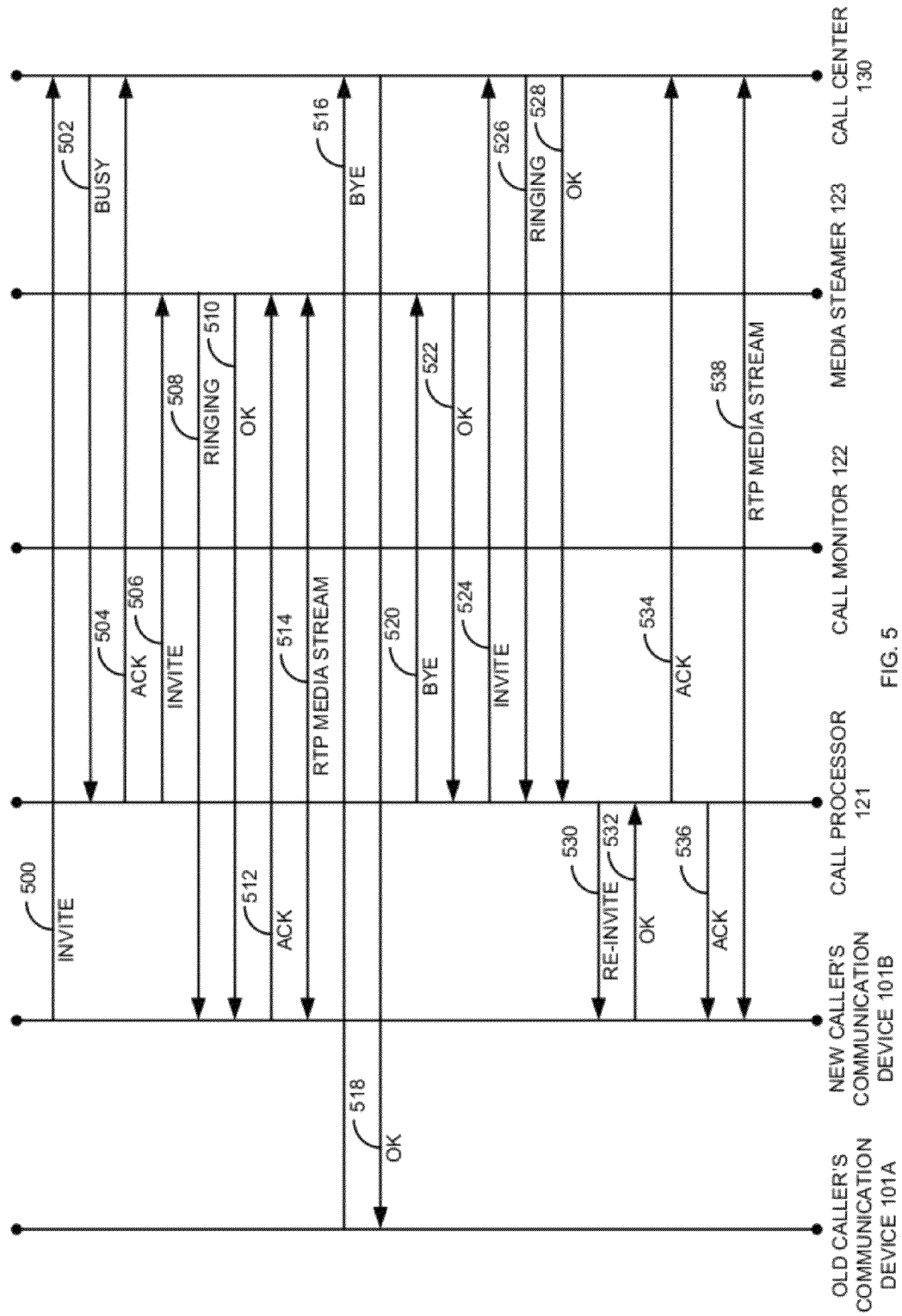
FIG. 5 is a flow diagram of a method for placing SIP calls on hold based on detecting a busy message.

FIG. 5 is a flow diagram of a method for placing SIP calls on hold based on detecting a busy message. Call monitor 122 monitors calls (SIP packets) between callers and call center 130. A new caller initiates a new SIP call from new caller's communication device 101B. This results in a SIP INVITE being sent from new caller's communication device 101B in step 500 to call center 130. At this point in time, call center 130 is at maximum call center capacity. Based on call center 130 being at maximum capacity, call center 130 responds in step 502 with a SIP BUSY message. Instead of passing the SIP BUSY onto new caller's communication device 101B, call processor 121 intercepts the SIP BUSY message. Call processor 121 responds to the SIP BUSY message by sending a SIP ACK in step 504 to call center 130. This results in call center 130 thinking that the new call from new caller's communication device 101B has been dropped.

Call processor 121 sends a SIP INVITE to media streamer 123 in step 506. Media streamer 123 answers in step 508 the SIP INVITE by responding with a SIP RINGING message and a SIP OK in step 510. New caller's communication device 101B responds to the SIP OK by sending a SIP ACK to media streamer 123 in step 512. The result is that the new call is placed on hold by media streamer 123 instead of going to call center 130. Media streamer 123 can now stream in step 514 (via a Real-time Transport Protocol (RTP) media stream) various messages to the new caller, such as call center 130 is experiencing heavy call volumes to new caller's communication device 101B.

An old caller's call is dropped. In this example, the old caller has hung up, resulting in the SIP BYE being sent in step 516 to call center 130. Call center 130 responds to the SIP BYE by sending a SIP OK in step 518 to the old caller's communication device 101A. Based on steps 516 and 518, call monitor 122 can determine that the maximum call center capacity is no longer being met because there is one less call being handled by call center 130. Based on the maximum call center capacity no longer being met, call processor 121 sends a SIP BYE in step 520 to media streamer 123. Media streamer 123 responds to the SIP BYE in step 522 with a SIP OK. Call processor 121 sends a SIP INVITE in step 524 to call center 130. Call center 130 responds to the SIP INVITE with a SIP RINGING message in step 526. When the call is answered by call center 130, a SIP OK is sent in step 528.

Call processor 121 also sends a SIP RE-INVITE to the new caller's communication device 101B in step 530. The new caller's communication device 101B responds to the SIP RE-INVITE with a SIP OK in step 532. Call processor 121 sends a SIP ACK in step 534 to call center 130 and a SIP ACK to the new caller's communication device 101B in step 536. This effectively transfers the new call from call parker 120 to call center 130. An RTP media stream can now be sent between the new caller's communication device 101B and call center 130 in step 538. The information sent in step 538 can be, for example, the audio of a user interacting with an Interactive Voice Response (IVR) system or the user talking to an agent in call center 130.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
monitoring calls, in a call monitor, to a call center to determine a number of active calls to the call center;
identifying, in the call monitor, a maximum call center capacity;
based on the monitoring calls, determining, in the call monitor, that the maximum call center capacity has been met by detecting a Session Initiation Protocol (SIP) BUSY message sent from the call center in response to a new call request, wherein the new call request is a SIP INVITE sent from a communication device to the call center;
responsive to determining that the maximum call center capacity has been met, intercepting, in a call processor, the SIP BUSY message from the call center instead of passing the SIP BUSY message onto the communication device that sent the new call request;
responding to the new call request with one or more call processing messages;
placing, in the call processor, the new call on hold; sending a message indicating that the call center is experiencing heavy call volume;
determining, in the call monitor, that the maximum call center capacity is no longer being met; and
responsive to determining that the maximum call center capacity is no longer being met, transferring, in the call processor, the new call to the call center.

2. The method of claim 1, wherein the new call request is for a voice call or a video call.

3. The method of claim 1, wherein identifying the maximum call center capacity comprises monitoring the number of active calls.

4. The method of claim 1, wherein identifying the maximum call center capacity is accomplished by getting a user-administered parameter.

5. The method of claim 1, wherein identifying the maximum call center capacity is accomplished by querying the call center.

6. The method of claim 1, further comprising the step of sending a second SIP INVITE to a media streamer in response to intercepting the SIP BUSY message.

7. The method of claim 1, further comprising the step of sending a SIP ACK message to the call center in response to intercepting the SIP BUSY message.

8. The method of claim 1, wherein determining the number of active calls to the call center comprises a number of calls placed to the call center and a number of calls placed from the call center.

9. The method of claim 1, wherein transferring the new call to the call center further comprises sending a SIP RE-INVITE to the communication device.

10. The method of claim 1, wherein determining that the call center capacity is no longer being met comprises detecting a SIP BYE message from the call center.

11. A system comprising:
a call monitor configured to monitor calls to a call center to determine a number of active calls to the call center, identify a maximum call center capacity, determine that the maximum call center capacity has been met by detecting a Session Initiation Protocol (SIP) BUSY message sent from the call center in response to a new call request, and determine that the maximum call center capacity is no longer being met, wherein the new call request is a SIP INVITE sent from a communication device to the call center;
a call processor configured to intercept the SIP BUSY message from the call center instead of passing the SIP BUSY message onto the communication device that sent the new call request, respond to the new call request with one or more call processing messages, place the new call on hold, and transfer the new call to the call center in response to determining that the maximum call center capacity is no longer being met; and a media streamer configured to send a message indicating that the call center is experiencing heavy call volume.

12. The system of claim 11, wherein the new call request is for a voice call or a video call.

13. The system of claim 11, wherein the call monitor is configured to identify the maximum call center capacity by monitoring the number of active calls.

14. The system of claim 11, wherein the call monitor is configured to identify the maximum call center capacity by getting a user-administered parameter.

15. The system of claim 11, wherein the call monitor is configured to identify the maximum call center capacity by querying the call center.

16. A non-transitory computer readable medium having stored thereon instructions that cause a processor to execute a method, the method comprising:
monitoring calls to a call center to determine a number of active calls to the call center;
identifying a maximum call center capacity;
based on the monitoring calls, determining that the maximum call center capacity has been met by detecting a Session Initiation Protocol (SIP) BUSY message sent from the call center in response to a new call request, wherein the new call request is a SIP INVITE sent from a communication device to the call center;
responsive to determining that the maximum call center capacity has been met, intercepting the SIP BUSY message from the call center instead of passing the SIP BUSY message onto the communication device that sent the new call request;
responding to the new call request with one or more call processing messages;
placing the new call on hold sending a message indicating that the call center is experiencing heavy call volume;
determining that the maximum call center capacity is no longer being met; and
responsive to determining that the maximum call center capacity is no longer being met, transferring the new call to the call center.

* * * * *